United States Patent
Karimli et al.

(10) Patent No.: US 10,171,649 B2
(45) Date of Patent: Jan. 1, 2019

(54) NETWORK-BASED DEVICE LOCKING MANAGEMENT

(71) Applicant: T-Mobile USA, Inc., Bellevue, WA (US)

(72) Inventors: Yasmin Karimli, Kirkland, WA (US); Cristian Asandului, Snoqualmie, WA (US); Kimberly Ann Bylund, Seattle, WA (US); Thomas P. Lucht, Seattle, WA (US); Phani Ramisetty, Sammamish, WA (US); Shelby Seward, Bellevue, WA (US); Arturo Silis, Newcastle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/494,305

(22) Filed: Apr. 21, 2017

(65) Prior Publication Data
US 2018/0309868 A1     Oct. 25, 2018

(51) Int. Cl.
*H04M 3/16*     (2006.01)
*H04M 1/725*     (2006.01)
(Continued)

(52) U.S. Cl.
CPC ........ *H04M 1/72577* (2013.01); *G06F 21/44* (2013.01); *G06Q 20/202* (2013.01); *G06Q 20/3229* (2013.01); *H04B 1/3816* (2013.01)

(58) Field of Classification Search
CPC .. H04M 1/72577; H04B 1/3816; G06F 21/44; G06Q 20/3229; G06Q 20/202
(Continued)

(56) References Cited

U.S. PATENT DOCUMENTS 6,226,749 B1    5/2001    Carloganu et al.
6,317,836 B1    11/2001    Goren et al.
(Continued)

FOREIGN PATENT DOCUMENTS

CN           1331371        8/2007
CN        101398872 A     4/2009
(Continued)

OTHER PUBLICATIONS

Barriga, L., et al., "M2M Remote-Subscription Management", Ericsson Review, 2011, 6 pages.
(Continued)

*Primary Examiner* — Amancio Gonzalez
(74) *Attorney, Agent, or Firm* — Lee & Hayes, PLLC

(57) ABSTRACT

Network-based device management is described. In an example, a server may receive, from a device, a request to change from a first, locked state to a second state. The server may access data associated with at least one of the device or an account associated with the device, and may compare the data with one or more predetermined rules. Satisfaction of the one or more predetermined rules may be necessary to effectuate a change from the first, locked state to the second state. The server may determine that the data satisfies the one or more predetermined rules and the server may send, to the device, an instruction to enable the device to change from the first, locked state to the second state. The instruction may direct an application on the device to effectuate a change to the subscriber identity module (SIM) card associated with the device.

20 Claims, 7 Drawing Sheets

(51) Int. Cl.
*G06Q 20/32* (2012.01)
*G06Q 20/20* (2012.01)
*G06F 21/44* (2013.01)
*H04B 1/3816* (2015.01)

(58) Field of Classification Search
USPC .......................................................... 455/411
See application file for complete search history.

(56) References Cited

U.S. PATENT DOCUMENTS

| | | | |
|---|---|---|---|
| 6,321,079 B1 | 11/2001 | Cooper | |
| 6,327,660 B1 | 12/2001 | Patel | |
| 7,689,204 B2 | 3/2010 | Dupuis et al. | |
| 8,369,823 B2 * | 2/2013 | Chen | H04W 12/12 455/404.1 |
| 8,737,318 B2 * | 5/2014 | Fan | H04M 15/00 370/329 |
| 9,055,443 B2 | 6/2015 | Froelich et al. | |
| 9,172,538 B2 | 10/2015 | Obaidi | |
| 9,319,884 B2 | 4/2016 | Buzescu et al. | |
| 9,456,349 B2 * | 9/2016 | Kim | H04W 12/08 |
| 9,591,484 B2 | 3/2017 | Ionescu et al. | |
| 2005/0172135 A1 | 8/2005 | Wiersma | |
| 2006/0075259 A1 | 4/2006 | Bajikar et al. | |
| 2007/0072620 A1 | 3/2007 | Levitan | |
| 2007/0154014 A1 | 7/2007 | Aissi et al. | |
| 2007/0180269 A1 | 8/2007 | Irish et al. | |
| 2007/0264990 A1 | 11/2007 | Droste et al. | |
| 2008/0090614 A1 | 4/2008 | Sicher et al. | |
| 2008/0125084 A1 | 5/2008 | Cambois et al. | |
| 2008/0132226 A1 | 6/2008 | Carnall | |
| 2008/0209206 A1 | 8/2008 | Vaha-Sipila et al. | |
| 2008/0229092 A1 | 9/2008 | Dale et al. | |
| 2008/0282084 A1 | 11/2008 | Hatakeyama | |
| 2008/0307494 A1 | 12/2008 | Holtzman et al. | |
| 2009/0083858 A1 | 3/2009 | Jennings et al. | |
| 2009/0158419 A1 | 6/2009 | Boyce | |
| 2009/0165119 A1 | 6/2009 | Ramanath | |
| 2009/0270126 A1 | 10/2009 | Liu | |
| 2009/0325646 A1 | 12/2009 | Stewart et al. | |
| 2010/0082968 A1 | 4/2010 | Beverly | |
| 2010/0263043 A1 | 10/2010 | Xu | |
| 2010/0273452 A1 | 10/2010 | Rajann et al. | |
| 2010/0299744 A1 | 11/2010 | Mardiks | |
| 2011/0076986 A1 | 3/2011 | Glendinning et al. | |
| 2011/0081889 A1 | 4/2011 | Gao et al. | |
| 2011/0130117 A1 | 6/2011 | Fan et al. | |
| 2011/0130118 A1 | 6/2011 | Fan et al. | |
| 2011/0159843 A1 | 6/2011 | Heath et al. | |
| 2011/0212706 A1 | 9/2011 | Uusilehto | |
| 2011/0307711 A1 | 12/2011 | Novak et al. | |
| 2012/0042376 A1 | 2/2012 | Dolgunov et al. | |
| 2012/0042396 A1 | 2/2012 | Guerra et al. | |
| 2012/0058743 A1 | 3/2012 | Chen | |
| 2012/0083242 A1 | 4/2012 | Spitz et al. | |
| 2012/0101941 A1 | 4/2012 | Kang et al. | |
| 2013/0078951 A1 | 3/2013 | Mun et al. | |
| 2013/0304616 A1 | 11/2013 | Raleigh et al. | |
| 2013/0305047 A1 | 11/2013 | Xi et al. | |
| 2013/0326643 A1 | 12/2013 | Pai et al. | |
| 2014/0057597 A1 | 2/2014 | Velusamy et al. | |
| 2015/0007275 A1 | 1/2015 | Hilbert et al. | |
| 2016/0019735 A1 | 1/2016 | Myers et al. | |
| 2016/0029220 A1 | 1/2016 | Obaidi | |
| 2016/0100309 A1 | 4/2016 | Velusamy | |

FOREIGN PATENT DOCUMENTS

| | | |
|---|---|---|
| EP | 1359733 A1 | 11/2003 |
| EP | 2063378 | 5/2009 |
| WO | WO2004063871 A2 | 7/2004 |
| WO | WO2008077628 A2 | 7/2008 |
| WO | WO2013158977 | 10/2013 |

OTHER PUBLICATIONS

Cartes 2012 Demo Presentation, Giesecke and Devrient, retrieved Jun. 16, 2016 from «https://www.gi-de.com/gd_media/media/documents/complementary_material/events_1/04_STE_CARTES_Demo_Presentation.pdf», 9 pages.

"Device Management Architecture", Open Mobile Alliance, Feb. 2016, pp. 13-23, 30-32, 45-53, 93-99.

Kanonov, U., "Secure Containers in Android: the Samsung KNOX Case Study", arXiv:1605.08567, May 27, 2016, pp. 1-19.

Offcie Action for U.S. Appl. No. 13/796,550, dated Aug. 25, 2017, Velusamy, "SIM Level Mobile Security", 25 pages.

"OMA Device Management Protocol", Open Mobile Alliance, Feb. 2016, pp. 7-16.

"Sim lock", Wikipedia, retrieved Jun. 30, 2017, from «https://en.wikipedia.org/w/index.php?title=SIM_lock&oldid=715512588», pp. 1-12.

"Subscriber Identity Module", Wikipedia, retrieved Jun. 17, 2017, from «https://en.wikipedia.org/w/index.php?title=Subscriber_identity_module&oldid=712259654», pp. 1-12.

Chinese Office Action dated Jun. 2, 2017 for Chinese patent application No. 201380020694.9, a counterpart foreign application of U.S. Pat. No. 9,319,884.

Lee, et al., "A New Delegation-Based Authentication Protocol for Use in Portable Communication Systems", IEEE Transactions on Wireless Communications, vol. 4, No. 1, Jan. 2005, pp. 57-64, 9 pages.

Chinese Office Action dated Feb. 26, 2016 for Chinese patent application No. 201280053062.8, a counterpart foreign application of U.S. Pat. No. 9,055,443, 23 pages.

Extended European Search Report dated Nov. 11, 2015 for European patent application No. 1377892238, 6 pages.

Extended European Search Report dated Nov. 27, 2015 for European patent application No. 13778691.9, 9 pages.

Extended European Search Report dated May 20, 2015 for European Patent Application No. 12843678.9, 8 pages.

Final Office Action for U.S. Appl. No. 13/660,350, dated Jan. 13, 2014, Ahmad Arash Obaidi, "Mobile Device-Type Locking", 8 pages.

Office action for U.S. Appl. No. 13/796,550, dated Jan. 11, 2016, Velusamy et al., "SIM Level Mobile Security", 20 pages.

Office Action for U.S. Appl. No. 13/796,550, dated Jan. 26, 2015, Senthil Kumar Mulluppadi Velusamy, "SIM Level Mobile Security", 18 pages.

Office Action for U.S. Appl. No. 13/842,116, dated Jan. 27, 2015, Ahmad Arash Obaidi, "Secure Lock for Mobile Device", 7 pages.

Office action for U.S. Appl. No. 13/796,550, dated Nov. 10, 2016, Velusamy et al., "SIM Level Mobile Security", 23 pages.

Final Office Action for U.S. Appl. No. 13/840,045, dated Nov. 17, 2014, Adrian Buzescu, "Remote Unlocking of Telecommunication Device Functionality", 12 pages.

Office Action for U.S. Appl. No. 14/874,023, Obaidi, dated Dec. 21, 2015, 7 pages.

Office action for U.S. Appl. No. 13/839,189, dated Dec. 23, 2015, Ionescu et al., "Secure Environment for Subscriber Device", 14 pages.

Office Action for U.S. Appl. No. 13/839,189, dated Feb. 24, 2015, Alexandru Catalin Ionescu, "Secure Environment for Subscriber Device", 8 pages.

Office action for U.S. Appl. No. 13/796,550, dated Mar. 29, 2017, Velusamy et al., "SIM Level Mobile Security", 24 pages.

Final Office Action for U.S. Appl. No. 13/796,550, dated May 13, 2015, Senthil Kumar Mulluppadi Velusamy, "SIM Level Mobile Security", 18 pages.

Final Office Action for U.S. Appl. No. 13/796,550, dated May 23, 2016, Senthil Kumar Mulluppadi Velusamy, "SIM Level Mobile Security", 22 pages.

Office action for U.S. Appl. No. 13/839,189, dated Jul. 11, 2016, Ionescu et al., "Secure Environment for Subscriber Device", 15 pages.

Office Action for U.S. Appl. No. 13/660,350, dated Jul. 22, 2013, Obaidi, "Mobile Device-Type Locking", 8 pages.

(56) References Cited

OTHER PUBLICATIONS

Office action for U.S. Appl. No. 13/840,045, dated Jul. 29, 2015, Buzescu et al., "Remote Unlocking of Telecommunication Device Functionality", 10 pages.
Office action for U.S. Appl. No. 13/840,045, dated Jul. 30, 2014, 24 pages.
Office action for U.S. Appl. No. 13/839,189, dated Aug. 21, 2015, Ionescu et al., "Secure Environment for Subscriber Device", 7 pages.
Office action for U.S. Appl. No. 13/660,350, dated Aug. 7, 2014, Froelich et al., "Mobile Device-Type Locking", 8 pages.
PCT Search Report and Written Opinion dated Jan. 17, 2013 for PCT Application No. PCT/US12/62050, 10 pages.
PCT Search Report and Written Opinion dated Jul. 1, 2013 for PCT Application No. PCT/US13/37345, 10 pages.
PCT Search Report and Written Opinion dated Jul. 30, 2013 for PCT Application No. PCT/US13/37332, 13 pages.
PCT Search Report and Written Opinion dated Sep. 17, 2013 for PCT Application No. PCT/US13/37381, 11 pages.
European Office Action dated Nov. 30, 2017 for European patent application No. 13778691.9, a counterpart foreign application of U.S. Pat. No. 9,319,884, 5 pages.
European Office Action dated Mar. 9, 2018 for European Patent Application No. 12843678.9, a counterpart foreign application of U.S. Pat. No. 9,055,443, 8 pages.
Office action for U.S. Appl. No. 13/796,550, dated Jan. 12, 2018, Velusamy et al., "SIM Level Mobile Security", 27 pages.
The European Office Action dated May 8, 2018 for European patent application No. 13778922.8, a counterpart foreign application of U.S. Pat. No. 9,591,484, 4 pages.
The PCT Search Report and Written Opinion dated Jul. 27, 2018, for PCT Application No. PCT/US18/27490, 11 pages.

\* cited by examiner

NETWORK-BASED DEVICE LOCKING MANAGEMENT

BACKGROUND

Consumers may acquire (e.g., purchase, lease, rent, etc.) telecommunication devices (e.g., mobile devices and other devices capable of performing telecommunication services) from various telecommunication service providers. In some examples, a consumer may purchase a mobile device from a first telecommunication service provider that offers mobile devices at subsidized prices. That is, in some examples, a consumer may purchase a mobile device from the first telecommunication service provider at a price that is lower than a price that the mobile device is offered for sale by a second telecommunication service provider. In such examples, service plans available from the first telecommunication service provider may have different, and in some examples, less favorable, terms than service plans that are available from the second telecommunication service provider. To minimize the out of pocket price of a mobile device and maximize favorable terms for a service plan, a consumer may purchase a mobile device from the first telecommunication service provider and activate the mobile device with the second telecommunication service provider. Accordingly, the consumer may have acquired the mobile device at a subsidized price and yet may obtain a service plan for the mobile device that offers more favorable terms than the terms available via the first telecommunication service provider.

Mobile devices may be associated with subscriber identity module (SIM) cards which store personal information of respective account holders. A SIM card may be a portable memory chip or an integrated memory chip (eSIM). A SIM card associated with a mobile device may include data associated with a phone number of an account holder associated with the mobile device, an address book of the account holder, text messages sent and received via the mobile device, and other data. Generally, when a consumer opens an account associated with a telecommunication service provider, the telecommunication service provider may activate a SIM card of a mobile device associated with the account. That is, each SIM card includes a unique number printed on the memory chip which requires activation by the telecommunication service provider (e.g., via a website associated with the telecommunication service provider, via a call to the telecommunication service provider, etc.).

To prevent consumers from engaging in the behavior described above (e.g., purchasing a mobile device from a first telecommunication service provider that sells the mobile device at a subsidized price and activating the mobile device with a second telecommunication service provider that provides better service plan terms), telecommunication service providers may lock SIM cards on mobile devices. That is, telecommunication service providers may lock SIM cards on mobile devices such that SIM cards are tied to particular telecommunication service providers and/or can only be used with particular service plans from the particular telecommunication service providers. Furthermore, in some examples, telecommunication service providers may lock mobile devices such that certain mobile devices will only work with SIM cards from the telecommunication service provider.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
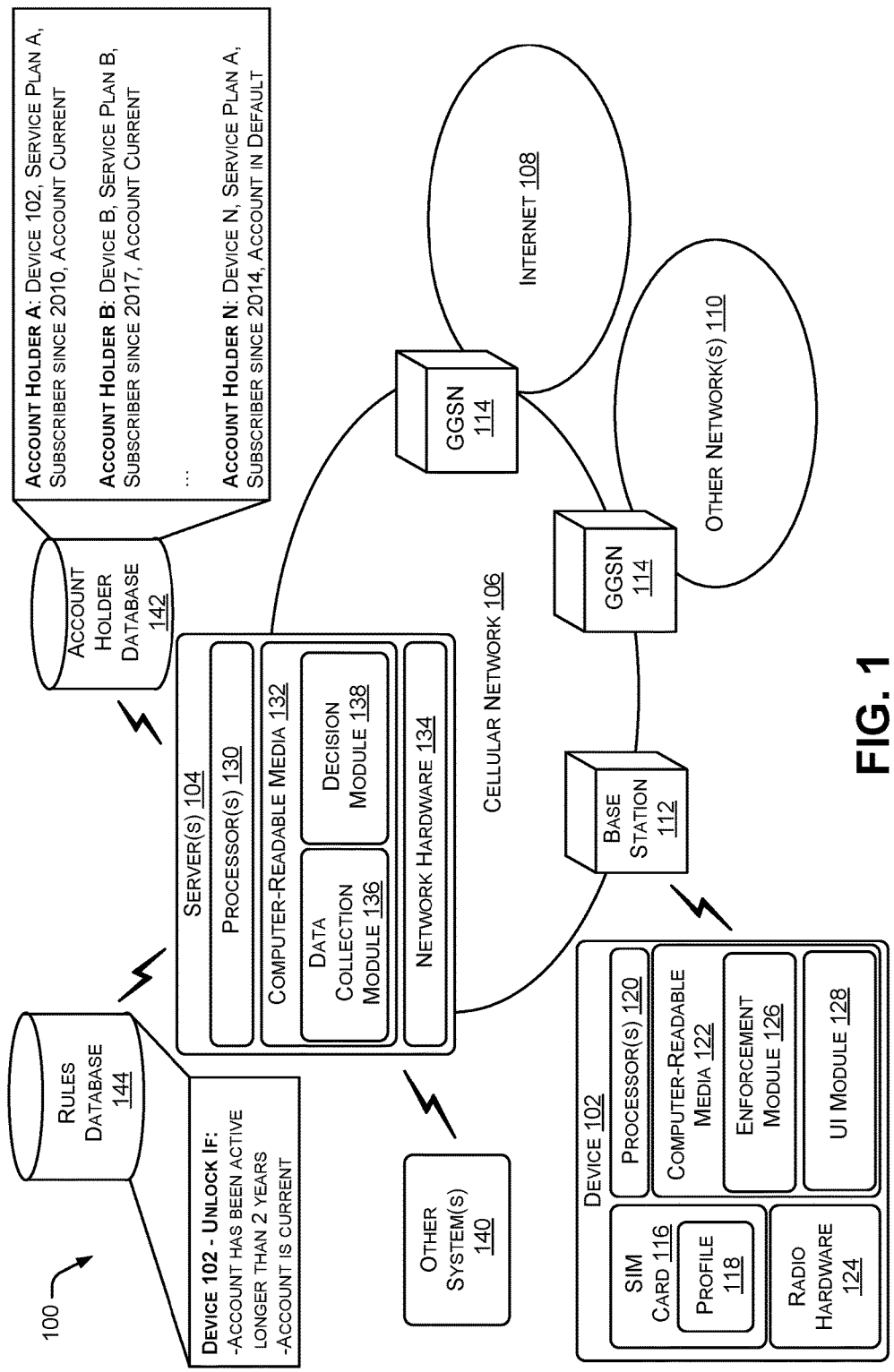
FIG. 1 illustrates an environment for facilitating network-based device management.

In examples of the present disclosure, network-based device management is described. As described above, consumers may acquire (e.g., purchase, lease, rent, etc.) telecommunication devices (e.g., mobile devices and other devices capable of performing telecommunication services) from various telecommunication service providers. In some examples, different telecommunication service providers may offer mobile devices for acquisition at different prices and with different service plans. As described above, to minimize the out of pocket price of a mobile device and maximize favorable terms for a service plan, a consumer may purchase a mobile device from a first telecommunication service provider that offers mobile devices for acquisition at prices lower than a second telecommunication service provider and activate the mobile device with the second telecommunication service provider, which offers service plans with more favorable terms. Accordingly, a consumer may acquire a mobile device at a subsidized price and yet may obtain a service plan for the mobile device that offers more favorable terms than the terms available via the first telecommunication service provider.

As described above, telecommunication service providers may prevent consumers from engaging in the behavior described above by locking subscriber identity module (SIM) cards on mobile devices. That is, telecommunication service providers may lock SIM cards on mobile devices such that SIM cards are tied to particular telecommunication service providers and can only be used with particular service plans from the particular telecommunication service providers. Furthermore, in some examples, telecommunication service providers may lock mobile devices such that certain mobile devices will only work with SIM cards from the telecommunication service provider.

Techniques described herein are directed to network-based device management. More specifically, techniques described herein are directed to network-based SIM card management. In at least one example, a server may store one or more rules for unlocking a mobile device. In at least one example, the server may access data associated with a mobile device and/or an account associated with the mobile device and may leverage the data to determine whether the one or more rules have been satisfied. Based at least in part on determining that the one or more rules have been satisfied, the server may send an instruction to the mobile device. The instruction may direct the mobile device to unlock the mobile device. A mobile device may be unlocked based on a modification of a relationship between a SIM card and a mobile device and/or a modification of a profile associated with a SIM card. That is, the instruction may direct the mobile device to modify the relationship between the SIM card associated with the mobile device and the mobile device and/or a profile associated with the SIM card.

The mobile device may receive the instruction and may execute the instruction. That is, the mobile device may effectuate the unlocking mechanism. Based at least in part on unlocking the mobile device, a consumer associated with the mobile device may use the mobile device with any telecommunication service provider and/or may modify the service plans used with the operation of the mobile device. In some examples, unlocking the mobile device may enable the mobile device, or an account associated with the mobile device, to access particular services, functionalities, etc. and/or relieve a restriction. In at least one example, the mobile device may be permanently unlocked. In alternative examples, the mobile device may be temporarily unlocked. For the purpose of this discussion, a mobile device may be temporarily unlocked such that upon an occurrence of an event (e.g., a lapse of a predetermined period of time, a determination that a device is outside of a geographic region, determination that an account associated with the device is not current, etc.) can cause the device to be re-locked. Additionally and/or alternatively, the mobile device may be partially unlocked. For the purpose of this discussion, a mobile device may be partially unlocked by unlocking one or more services and/or one or more functionalities independently (i.e., as opposed to all together). A mobile device may be partially unlocked permanently or temporarily. Additional details associated with the unlocking mechanism are described below in reference to the figures.

FIG. 1 illustrates an environment 100 for facilitating network-based device management. As illustrated, environment 100 includes at least one device 102 communicatively coupled to server(s) 104 via a cellular network 106, the Internet 108, and/or one or more other networks 110. In at least one example, device 102 may connect to the cellular network 106 via a corresponding base station 112. The cellular network 106 may be responsible for routing voice communication to other networks 110, as well as routing data communication to external packet switched networks, such as the Internet 108. For example, the cellular network 106 may include a Gateway GPRS Support Node (GGSN) 114 or another equivalent node.

Device 102 may correspond to user equipment (UE), which may be operated by an account holder. The account holder may be an entity (e.g., person, company, etc.) that subscribes to telecommunication services via a service plan. The service plan may indicate an amount of data, voice calling, and/or text messaging available to the device 102, whether data, voice calling, and/or text messaging is available internationally, data transmission speeds accessible to the device 102, etc. The service plan may be available to the account holder for a particular rate. In some examples, the service plan is active for a particular period of time (e.g., a two-year plan, a five-year plan, etc.).

Device 102 may correspond to UE including, but not limited to, a smart phone, a personal digital assistant, a netbook, a laptop computer, a smart appliance, and/or another electronic device that is capable of sending or receiving voice, video, and/or data via the cellular network 106, the Internet 108, and/or one or more other network(s) 110 (e.g., a Wi-Fi network, another access network, etc.). In an example where a UE is a mobile device, the mobile device may include a subscriber identity module (SIM) card 116, which may store personal information of an account holder. The SIM card 116 may be a portable memory chip or an integrated memory chip (eSIM). The SIM card 116 may include data associated with a phone number of an account holder associated with the mobile device, an address book of the account holder, text messages sent and received via the mobile device, and other data.

In at least one example, the SIM card 116 may include a profile 118. The profile 118 may include at least one group identifier. The group identifier may be associated with a particular channel, particular brand, etc. of a telecommunication service provider. That is, the group identifier may indicate which channel, brand, etc. the device 102 is associated with. Accordingly, the group identifier may indicate which service plans, services, functionalities, etc. are available for the device 102.

Device 102 may include processor(s) 120, computer-readable media 122, and radio hardware 124. Processor(s) 120 can represent, for example, a CPU-type processing unit, a GPU-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc. In at least one example, an accelerator can represent a hybrid device, such as one from ZYLEX or ALTERA that includes a CPU course embedded in an FPGA fabric. In various embodiments, the processor(s) 120 can execute one or more modules and/or processes to cause the mobile device 300 to perform a variety of functionalities, as set forth above and explained in further detail in the following disclosure. Additionally, each of the processor(s) 120 can possess its own local memory, which also can store program modules, program data, and/or one or more operating systems.

Depending on the exact configuration and type of the device 102, the computer-readable media 122, can include computer storage media and/or communication media.

Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In at least one example, the computer storage media can include non-transitory computer-readable media. Non-transitory computer-readable media can include volatile and nonvolatile, removable and non-removable tangible, physical media implemented in technology for storage of information, such as computer readable instructions, data structures, program modules, or other data. Computer-readable media 122 is an example of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the mobile device 300. Any such non-transitory computer-readable media can be part of the mobile device 300.

In contrast, communication media includes computer readable instructions, data structures, program modules, or other data in a modulated data signal, such as a carrier wave, or other transmission mechanism. As defined herein, computer storage media does not include communication media.

The computer-readable media 122 can include one or more modules and data structures including, for example, an enforcement module 126 and a UI module 128. The one or more modules and data structures can be in the form of stand-alone applications, productivity applications, an operating system component, or any other application or software module configured to facilitate the enforcement of SIM card management on the device 102, as described herein.

The enforcement module 126 may receive instruction(s) from the server(s) 104 and may execute the instruction(s). In at least one example, the instruction(s) may instruct the device 102 to modify an aspect of the device 102 to effectuate a change from a first state to a second state. The first state may correspond to a locked state. The second state may correspond to an unlocked state. Accordingly, the instruction(s) may direct the device 102 to effectuate an unlocking mechanism. In at least one example, the instruction(s) may direct the device 102 to modify a relationship between the SIM card 116 and the device 102 and/or modify the profile 118 associated with the SIM card 116. Additional details associated with unlocking a device 102 are described below with reference to FIG. 2.

The UI module 128 may be configured to present user interface(s) via the device 102. In at least one example, the UI module 128 may generate a graphical user interface and may present the graphical user interface via a display of the device 102. The graphical user interface may be associated with one or more graphical representations. Each of the graphical representations may be associated with different resources (e.g., features and/or functionalities). In at least one example, a graphical representation may be associated with a control, the actuation of which activates a corresponding resource. For instance, a graphical representation may be associated with an unlocking resource. An account holder may interact with the user interface to actuate the control corresponding to the unlocking resource. Based at least in part on actuating the control, the device 102 may send a request to the server(s) 104 to unlock the device 102. A non-limiting example of a graphical user interface is provided below with reference to FIG. 5.

Radio hardware 124 provides wireless UE capabilities, such as connecting to the base station 112, a Wi-Fi network, or other wireless networks. The radio hardware 124 may include or be incorporated into processors, application-specific integrated circuits (ASICs), programmable circuits such as field programmable gate arrays (FPGAs), or in other ways.

As described above, in at least one example, device 102 may connect to the cellular network 106 via a base station 112. A base station 112 may correspond to a fixed-location transceiver, which may also be called a cell site. As described above, some devices may not be capable of connecting to the cellular network 106 via a base station (e.g., base station 112). In such examples, a such devices may register with the cellular network 106 through the Internet 108 using a unique identifier, such as an IMPI or IMPU, a globally routable user agent URI (GRUU), or other. In at least one example, these identifiers may take the form of a telephone number.

A telecommunication service provider may be associated with one or more servers 104. Each of the server(s) 104 may be any type of server, such as a network-accessible server. In various examples, each of the server(s) 104 may be associated with one or more processors 130, computer-readable media 132, and network hardware 134. Processor(s) 130 can represent, for example, a CPU-type processing unit, a GPU-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip systems (SOCs), Complex Programmable Logic Devices (CPLDs), etc. In at least one example, an accelerator can represent a hybrid device, such as one from ZYLEX or ALTERA that includes a CPU course embedded in a FPGA fabric. In various embodiments, the processor(s) 130 can execute one or more modules and/or processes to cause the server(s) 104 to perform a variety of functionalities, as set forth above and explained in further detail in the following disclosure. Additionally, each of the processor(s) 130 can possess its own local memory, which also can store program modules, program data, and/or one or more operating systems.

Depending on the exact configuration and type of the server(s) 104, the computer-readable media 132 can include computer storage media and/or communication media.

Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In at least one example, the computer storage media can include non-transitory computer-readable media. Non-transitory computer-readable media can include volatile and nonvolatile, removable and non-removable tangible, physical media implemented in technology for storage of information, such as computer readable instructions, data structures, program modules, or other data. Computer-readable media 132 is an example of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the presence server. Any such non-transitory computer-readable media can be part of the presence server.

In contrast, communication media includes computer readable instructions, data structures, program modules, or other data in a modulated data signal, such as a carrier wave, or other transmission mechanism. As defined herein, computer storage media does not include communication media.

The computer-readable media 138 can include one or more modules and data structures including, for example, a data collection module 136 and a decision module 138. The one or more modules and data structures can be in the form of stand-alone applications, productivity applications, an operating system component, or any other application or software module having data items that facilitate SIM card management on devices, as described herein.

The data collection module 136 may access data from one or more data sources. In at least one example, the data collection module 136 may correspond to middleware, which may access data from one or more data sources. In some examples, the data collection module 136 may access data from the one or more data sources responsive to receiving a request to unlock a device 102. In additional and/or alternative examples, the data collection module 136 may access data from the one or more data sources at predetermined time intervals, after a lapse of a predetermined period of time, etc. Furthermore, in some examples, the data collection module 136 may receive an indication from a data source indicating that the data source has updated data and the data collection module 136 may access data from the data source responsive to receiving the indication.

The one or more data sources may be associated with other system(s) 140. The other system(s) 140 may include account holder onboarding system(s), billing system(s), etc. Account holder onboarding system(s) may provide data associated with onboarding account holders. For instance, account holder onboarding system(s) may identify an account holder and may indicate a datestamp and/or timestamp associated with when the corresponding account was opened. The account holder onboarding system(s) may identify a point of sale brand, channel, etc. associated with the opening of the account, a service plan associated with the account, etc. The billing system(s) may indicate a payment history associated with individual accounts. For instance, the billing system(s) may indicate when a most recent payment was made, whether the account is current (e.g., paid in full), whether the account is in default (e.g., has payment(s) outstanding), etc. Furthermore, the billing system(s) may indicate whether a price of a device 102 associated with the account is paid in full, or if the cost is not paid in full, an amount remaining until the price of the device 102 is paid in full. Additional and/or alternative system(s) may be associated with the other system(s) 140 and may serve as data sources that are accessible by the data collection module 136.

In at least one example, the data collection module 136 may access data and may provide the data directly to the decision module 138. In additional and/or alternative examples, the data collection module 136 may access data and may send the data to one or more database(s), including, but not limited to the account holder database 142. The account holder database 142 may store data such that the data is manageable, accessible, and updatable. The account holder database 142 may store data associated with individual account holders. That is, the account holder database 142 may include a plurality of data entries and each data entry may correspond to an individual account holder. Each data entry may be associated with one or more data items. That is, one or more data items may be mapped to, or otherwise associated with, each data entry. Each data item may represent an attribute of the account holder. Non-limiting examples of attributes include a device associated with an account, a point of sale associated with the device, a service plan associated with an account, a duration of time that an account has been active, whether an account is current (or in default), whether the price of the device has been paid in full (or a remaining balance), etc. As a non-limiting example, account holder database 142 illustrates a data entry associated with Account Holder A that includes data items identifying a device associated with the account (e.g., device 102), a service plan associated with the account (e.g., Service Plan A), a duration of time that the account has been active (e.g., since 2010), whether the account is current, etc.

The decision module 138 may determine whether to unlock a device 102, and to what extent the device 102 is to be unlocked. In at least one example, the decision module 138 may access a rules database 144. The rules database 144 may store one or more rules for determining whether to unlock a device. Non-limiting examples of rules may consider a length of time that an account associated with a device has been activated, whether the price of the device 102 has been paid in full, whether an account is current (i.e., paid in full), etc. For instance, as illustrated in FIG. 1, to unlock device 102, the account associated with device 102 must have been active for longer than two years and the account must be current. That is, if the account has been active for less than two years or the account is not current, the device 102 may not be unlocked. Additional details are described below.

In at least one example, each device may be associated with one or more predetermined rules, the satisfaction of which permits the device to be unlocked. In such examples, the rules database 144 may include one or more data entries and each data entry may correspond to a particular device (e.g., device 102). One or more predetermined rules may be mapped to, or otherwise associated with, each data entry. The one or more predetermined rules may be input by programmers and may be updated as appropriate.

In some examples, a cohort of devices may be associated with a particular set of one or more predetermined rules, the satisfaction of which permits a device in the cohort of devices to be unlocked. A cohort of devices may be two or more devices having at least one similar attribute. For instance, a cohort of devices may be associated with a same point of sale (e.g., a same brand, channel, etc.), a same device type, a same service plan, etc. In such examples, the rules database 144 may include one or more data entries and each data entry may correspond to a particular cohort of devices. One or more predetermined rules may be mapped to, or otherwise associated with, each data entry. The one or more predetermined rules may be input by programmers and may be updated as appropriate.

In some examples, as described above, a device may be permanently unlocked, temporarily unlocked, partially unlocked, etc. In such examples, a different set of one or more predetermined rules may be applicable to permanently unlock all previously unavailable services and/or functionalities, temporarily unlock all previously unavailable services and/or functionalities, or unlock one or more previously unavailable services and/or functionalities (i.e., partially unlock the device). For instance, for device 102, a first set of one or more predetermined rules may be required to be satisfied to permanently unlock all previously unavailable services and/or functionalities, a second set of one or more predetermined rules may be required to be satisfied to temporarily unlock all previously unavailable services and/or functionalities, a third set of one or more predetermined rules may be required to be satisfied to unlock one or more previously unavailable services and/or functionalities, etc. In such an example, each set of one or more predetermined rules may be mapped to, or otherwise associated with, a data entry in the rules database 144 that corresponds to the device 102. Additionally and/or alternatively, for a cohort of devices, a first set of one or more predetermined rules may be required to be satisfied to permanently unlock all previously unavailable services and/or functionalities for a device associated with the cohort of devices, a second set of one or more predetermined rules may be required to be satisfied to temporarily unlock all previously unavailable services and/or functionalities for the device associated with the cohort of devices, a third set of one or more predetermined rules may be required to be satisfied to unlock one or more previously unavailable services and/or functionalities for the device associated with the cohort of devices, etc. In such an example, each set of one or more predetermined rules may be mapped to, or otherwise associated with, a data entry in the rules database 144 that corresponds to the cohort of devices.

The decision module 138 may access the rules database 144 and data associated with the device 102 and/or an account associated with the device 102. In some examples, the decision module 138 may access the data associated with the device 102 and/or an account associated with the device 102 from the account holder database 142. In additional and/or alternative examples, the decision module 138 may access data associated with the device 102 and/or an account associated with the device 102 from the data collection module 136. The decision module 138 may leverage the data associated with the device 102 and/or an account associated with the device 102 to determine whether the device 102 is permitted to be unlocked, and if the device 102 is permitted to be unlocked, the capacity in which it is to be unlocked (e.g., permanently, temporarily, completely, and/or partially). That is, the decision module 138 may compare the data associated with the device 102 and/or an account associated with the device 102 with the applicable one or more predetermined rules for unlocking the device 102 and may determine whether the data associated with the device 102 and/or an account associated with the device 102 satisfies the applicable one or more predetermined rules. Additional details associated with comparing rule(s) in the rules database 144 with data associated with the device 102 and/or an account associated with the device 102 are described below with reference to FIG. 3.

In at least one example, based at least in part on determining that the device 102 is permitted to be unlocked, the decision module 138 may send an instruction to the device 102. The instruction may direct the device 102 to modify a relationship between the SIM card 116 and the device 102 and/or modify the profile 118 associated with the SIM card 116 such to unlock the device 102. In at least one example, the instruction may cause a modification to the relationship between the SIM card 116 and the device 102 so that the device 102 does not look to the SIM card 116 for performing certain functionalities. As a result, the device 102 may have access to previously unavailable services and/or functionalities. Or, the instruction may cause a modification to the profile 118 associated with the SIM card 116 so that the device 102 may access additional and/or alternative services from additional and/or alternative service providers.

In some examples, the instruction may direct the device 102 to modify a relationship between the SIM card 116 and the device 102 and/or modify the profile 118 associated with the SIM card 116 permanently. In other examples, the instruction may direct the device 102 to modify a relationship between the SIM card 116 and the device 102 and/or modify the profile 118 associated with the SIM card 116 temporarily. In such examples, the instruction may direct the device 102 to lock the device 102 upon an occurrence of an event. An event may correspond to a lapse in a predetermined period of time, a determination that the device 102 is outside of a particular geographical location, a determination that an account associated with the device 102 is no longer current (i.e., the account holder defaulted), etc. In some examples, the decision module 138 may send an instruction to the device 102 to lock the device. That is, in at least one example, the decision module 138 determine an occurrence of the event and may send an instruction to the device 102 to modify a relationship between the SIM card 116 and the device 102 and/or modify the profile 118 associated with the SIM card 116 such to lock the device. In at least one example, the decision module 138 may send an instruction to the device 102 based on an occurrence of an event.

In at least one example, the decision module 138 may send an indication to the device 102 indicating that a request to unlock the device 102 is denied. In some examples, the indication may include data identifying reasons that the request is denied.

In some examples, the decision module 138 may receive an instruction from a system of the other system(s) 140 that directs the decision module 138 to effectuate a change on the device 102. In such examples, such an instruction may be an override instruction. That is, the instruction may be applicable without requiring the application and/or satisfaction of any of the one or more predetermined rules. In such examples, the decision module 138 may send an instruction to one or more devices directing them to effectuate the change.

The network hardware 134 may provide wired or wireless networking capabilities to the server(s) 104. The network hardware 134 may include or be incorporated into processors, application-specific integrated circuits (ASICs), programmable circuits such as field programmable gate arrays (FPGAs), or in other ways.

The server(s) 104 may be associated with one or more databases, as described above. In some examples, the one or more databases may include a subscriber database 140, a rules database 142, etc. In some examples, the one or more databases may be integrated into a single database. In other examples, the one or more databases may be associated with individual databases, as shown in FIG. 1. In at least one example, the one or more databases may be integral to the server(s) 104. In other examples, the one or more databases may be communicatively coupled to the server(s) 104, as illustrated in FIG. 1.

Figure 2:
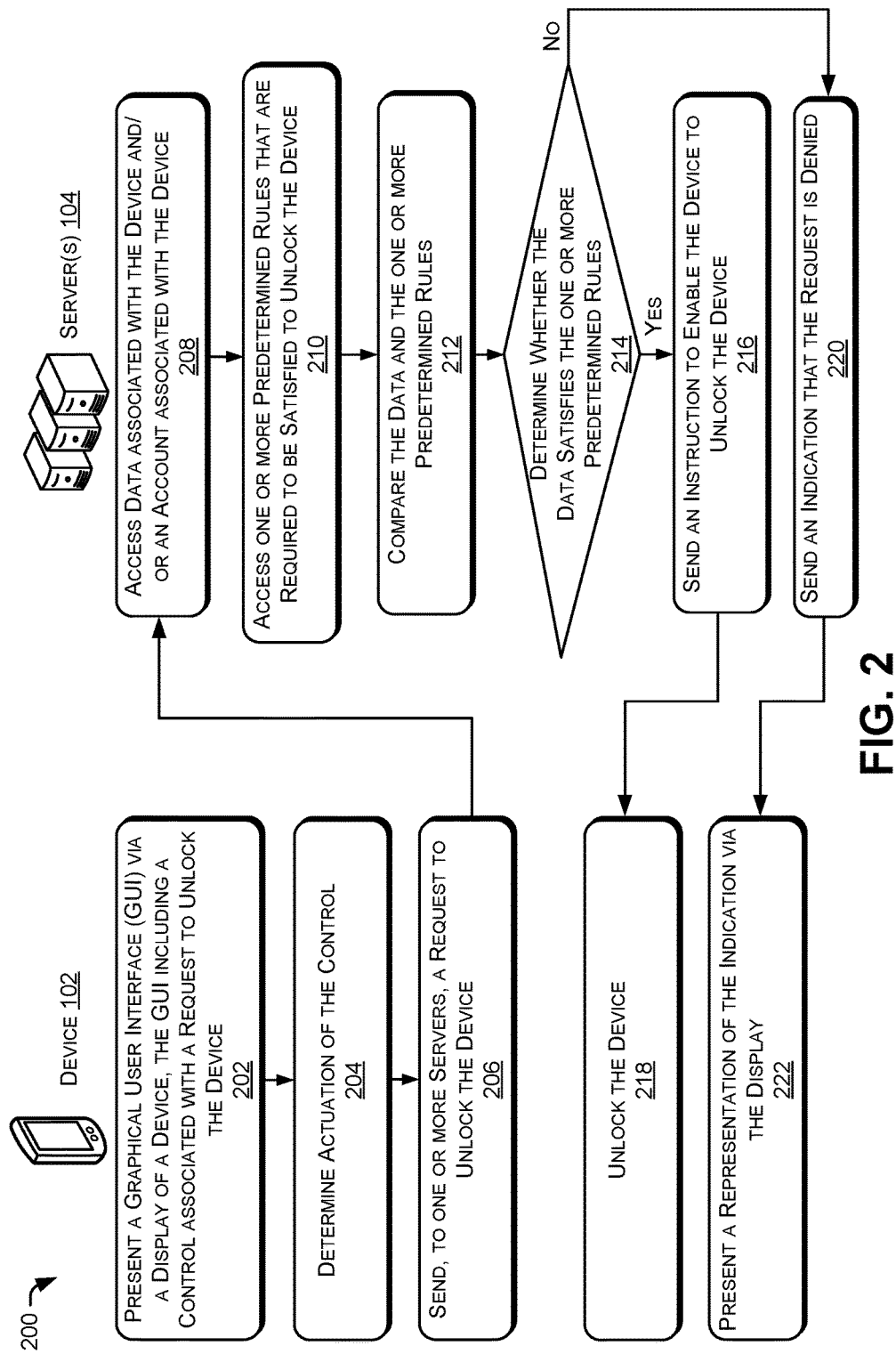
FIG. 2 illustrates an example process for facilitating network-based device management.
Figure 3A:
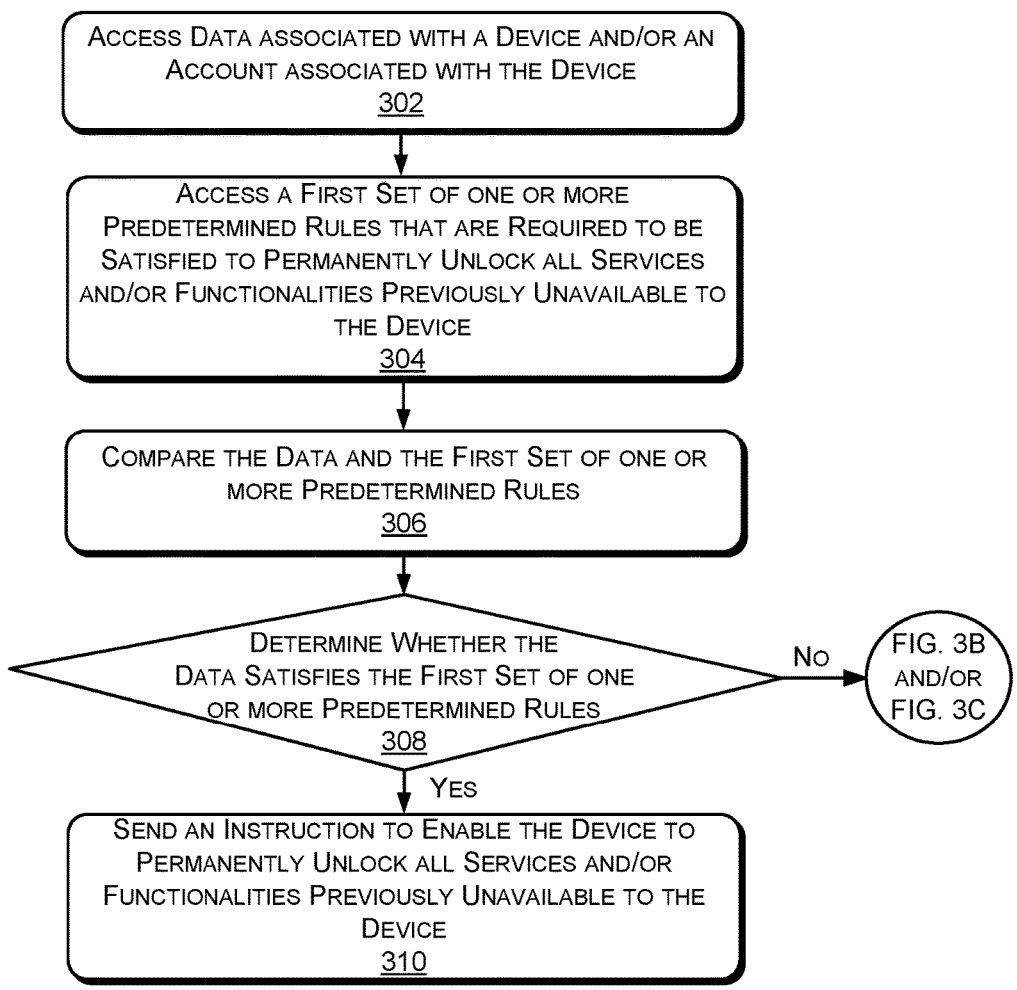
FIG. 3A illustrates a first portion of an example process for facilitating network-based device management.
Figure 3B:
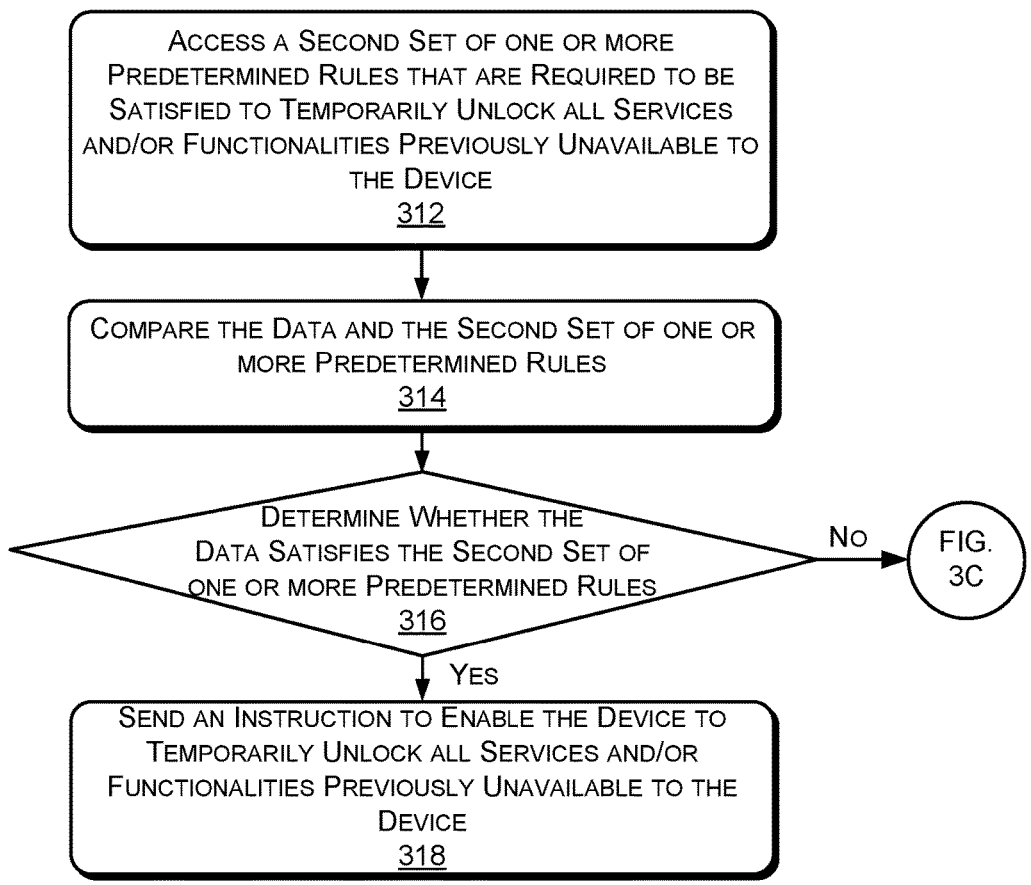
FIG. 3B illustrates a second portion of an example process for facilitating network-based device management.
Figure 3C:
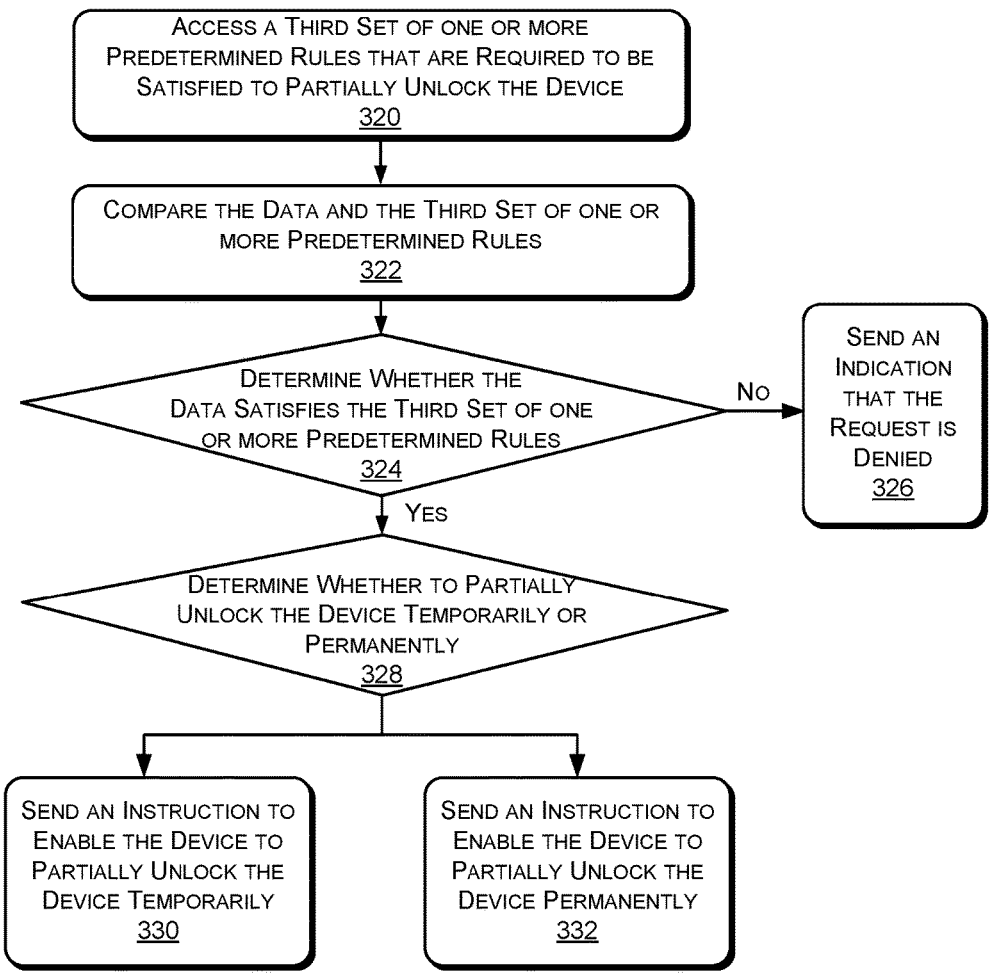
FIG. 3C illustrates a third portion of an example process for facilitating network-based device management.
Figure 4:
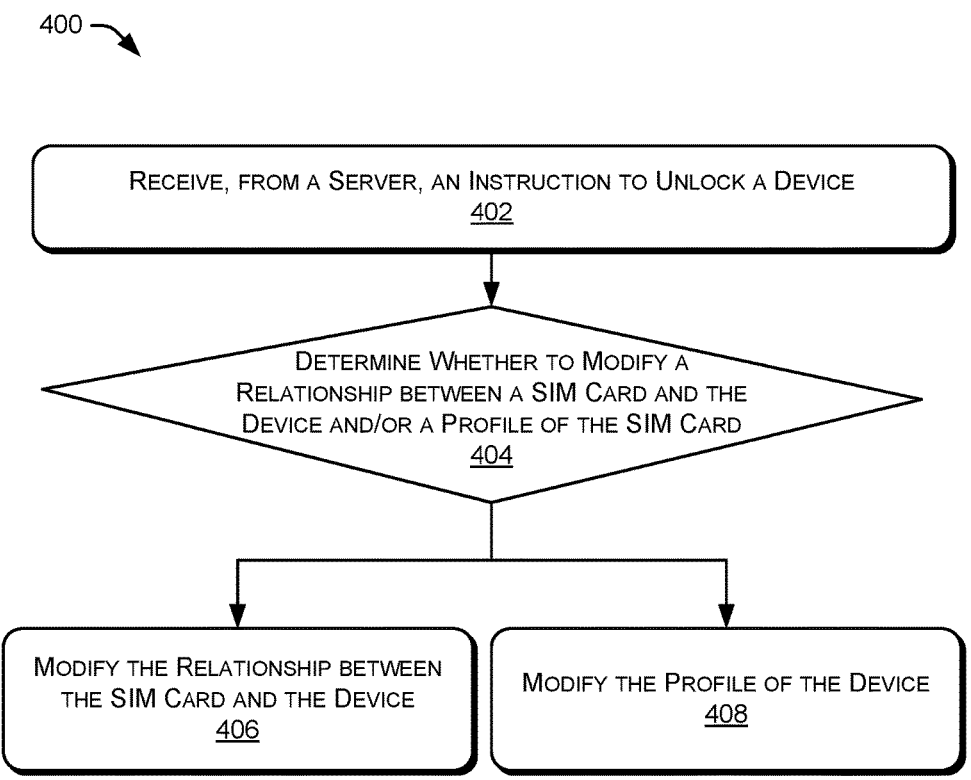
FIG. 4 illustrates an example process for unlocking a device.

FIGS. 2-4 describe example processes for facilitating network-based device management. The example processes are described in the context of the environments of FIG. 1, but are not limited to that environment.

The processes described above in association with FIGS. 2-4 can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functionalities or implement particular abstract data types. In other embodiments, hardware components perform one or more of the operations. Such hardware components may include or be incorporated into processors, application-specific integrated circuits (ASICs), programmable circuits such as field programmable gate arrays (FPGAs), or in other ways. The order in which the operations are described is not intended to be construed as a limitation, and any number of the described operations can be combined in any order and/or in parallel to implement the processes.

FIG. 2 illustrates an example process 200 for facilitating network-based device management.

Block 202 illustrates presenting a graphical user interface (GUI) via a display of a device, the GUI including a control associated with a request to unlock the device. As described above, the UI module 128 may be configured to present user interface(s) via the device 102. In at least one example, the UI module 128 may generate a graphical user interface and may present the graphical user interface via a display of the device 102. A non-limiting example of such a graphical user interface is described below with reference to FIG. 5. The graphical user interface may be associated with one or more graphical representations. Each of the graphical representations may be associated with different resources (e.g., features and/or functionalities). In at least one example, a graphical representation may be associated with a control, the actuation of which activates a corresponding resource. For instance, a graphical representation may be associated with an unlocking resource. An account holder may interact with the user interface to actuate the control corresponding to the unlocking resource.

Block 204 illustrates determining actuation of the control. The UI module 128 may determine actuation of the control. In at least one example, an account holder may interact with the graphical user interface via interface device(s) (e.g., keyboard, pointing device, etc.), touch input device(s), speech input device(s), etc. The UI module 128 may detect the interaction and may determine that the interaction corresponds to actuation of the control.

Block 206 illustrates sending, to one or more servers, a request to unlock the device. Based at least in part on determining actuation of the control, the device 102 may send a request to the server(s) 104 to unlock the device 102.

Block 208 illustrates accessing data associated with the device and/or an account associated with the device. In at least one example, the decision module 138 may access data associated with the device 102 and/or an account associated with the device 102. In at least one example, the decision module 138 may access data associated with the device 102 and/or the account associated with the device 102 responsive to receiving the request. However, in alternate examples, the decision module 138 may access data associated with the device 102 and/or the account associated with the device 102 without receiving a request. For instance, the decision module 138 may access data with the device 102 and/or the account associated with the device 102 at regular time intervals, after lapses of predetermined periods of time, etc. Additionally and/or alternatively, the decision module 138 may access data associated with the device 102 and/or an account associated with the device 102 based on receiving a request generated via another computing device (e.g., a point of sale device associated with a telecommunication service provider, etc.) and/or the server(s) 104.

In some examples, the data collection module 136 may access data and may provide the data directly to the decision module 138. In additional and/or alternative examples, the decision module 138 may access data associated with the device 102 and/or an account associated with the device 102 that is stored in the account holder database 142. In such examples, the decision module 138 may access data associated with the device 102 and/or an account associated with the device 102 from the account holder database 142.

As described above, the account holder database 142 may store data such that the data is manageable, accessible, and updatable. The account holder database 142 may store data associated with individual account holders. That is, the account holder database 142 may include a plurality of data entries and each data entry may correspond to an individual account holder. Each data entry may be associated with one or more data items. That is, one or more data items may be mapped to, or otherwise associated with, each data entry. Each data item may represent an attribute of the account holder. Non-limiting examples of attributes include a device associated with an account, a point of sale associated with the device, a service plan associated with an account, a duration of time that an account has been active, whether an account is current (or in default), whether the price of the device has been paid in full, etc.

Block 210 illustrates accessing one or more predetermined rules that are required to be satisfied to unlock the device. In at least one example, the decision module 138 may access a rules database 144. The rules database 144 may store one or more rules for determining whether to unlock a device, as described above. Non-limiting examples of rules may consider a length of time that an account associated with a device has been activated, whether the price of the device has been paid in full, whether an account is current (i.e., paid in full), etc.

Block 212 illustrates comparing the data and the one or more predetermined rules. As described above, the decision module 138 may compare the data associated with the device 102 and/or the account associated with the device 102 with the one or more predetermined rules and may determine whether the data associated with the device 102 and/or the account associated with the device satisfies the applicable one or more predetermined rules, as illustrated in block 214.

Block 216 illustrates sending an instruction to enable the device to unlock the device. Based at least in part on determining that the data associated with the device 102 and/or the account associated with the device 102 satisfies the one or more predetermined rules, the decision module 138 may send an instruction to the device 102 to unlock the device 102. The instruction may direct the device 102 to modify a relationship between the SIM card 116 and the device 102 and/or modify the profile 118 associated with the SIM card 116 such to unlock the device 102. In at least one example, the instruction may cause a modification to the relationship between the SIM card 116 and the device 102 so that the device 102 does not look to the SIM card 116 for performing certain functionalities. Or, the instruction may cause a modification to the profile 118 associated with the SIM card 116 so that the device 102 may access additional and/or alternative services from additional and/or alternative service providers. Based at least in part on receiving the instruction, the enforcement module 126 may unlock the device, as illustrated in block 218. The enforcement module 126 may receive the instruction and may effectuate the instruction. That is, the enforcement module 126 may unlock the device 102.

Block 220 illustrates sending an indication that the request is denied. Based at least in part on determining that the data associated with the device 102 and/or the account associated with the device 102 does not satisfy the one or more predetermined rules, the decision module 138 may determine that the device 102 is not permitted to be unlocked. In such an example, the decision module 138 may send an indication to the device 102 indicating that the request to unlock the device 102 is denied. In some examples, the indication may include data identifying reasons that the request is denied.

Based at least in part on receiving the indication that the request is denied, the presentation module 128 may generate and present a representation of the indication via the display, as illustrated in block 222. In some examples, the UI module 128 may access the instruction, generate a representation of the indication, and present the indication via a graphical user interface presented via the display of the device 102. A non-limiting example of such a graphical user interface is described below with reference to FIG. 6.

FIGS. 3A-3C illustrate an example process 300 for facilitating network-based device management.

Block 302 illustrates accessing data associated with a device and/or an account associated with the device. In at least one example, the decision module 138 may access data associated with the device 102 and/or an account associated with the device 102. In at least one example, the decision module 138 may access data associated with the device 102 and/or the account associated with the device 102 responsive to receiving the request. However, in alternate examples, the decision module 138 may access data associated with the device 102 and/or the account associated with the device 102 without receiving a request. For instance, the decision module 138 may access data with the device 102 and/or the account associated with the device 102 at regular time intervals, after lapses of predetermined periods of time, etc. In some examples, the data collection module 136 may access data and may provide the data directly to the decision module 138. In additional and/or alternative examples, the decision module 138 may access data associated with the device 102 and/or an account associated with the device 102 that is stored in the account holder database 142.

Block 304 illustrates accessing a first set of one or more predetermined rules that are required to be satisfied to permanently unlock all services and/or functionalities previously unavailable to the device. In at least one example, the decision module 138 may access a rules database 144 and may access a first set of one or more predetermined rules that are mapped to, or otherwise associated with, a data entry corresponding to the device 102 (or a cohort of devices to which the device 102 belongs). The satisfaction of the first set of one or more predetermined rules may be conditional to permanently unlocking all services and/or functionalities previously unavailable to the device 102. In at least one example, the first set of one or more predetermined rules may be the most stringent set of one or more predetermined rules.

Block 306 illustrates comparing the data and the first set of one or more predetermined rules. As described above, the decision module 138 may compare the data associated with the device 102 and/or the account associated with the device 102 with the first set of one or more predetermined rules and may determine whether the data associated with the device 102 and/or the account associated with the device satisfies the first set of one or more predetermined rules, as illustrated in block 308.

Responsive to determining that the data satisfies the first set of one or more predetermined rules, the decision module 138 may send an instruction to enable the device to permanently unlock all services and/or functionalities previously unavailable to the device 102, as illustrated in block 310. Based at least in part on determining that the data associated with the device 102 and/or the account associated with the device 102 satisfies the first set of one or more predetermined rules, the decision module 138 may send an instruction to the device 102 to unlock all services and/or functionalities previously unavailable to the device 102. The instruction may direct the device 102 to modify a relationship between the SIM card 116 and the device 102. In at least one example, the instruction may cause a modification to the relationship between the SIM card 116 and the device 102 so that the device 102 does not look to the SIM card 116 for performing certain functionalities. Additionally and/or alternatively, the instruction may direct the device 102 to modify the profile 118 associated with the SIM card 116. In at least one example, the instruction may cause a modification to the profile 118 associated with the SIM card 116 so that the device 102 may access additional and/or alternative services from additional and/or alternative service providers.

Responsive to determining that the data does not satisfy the first set of one or more predetermined rules, the process may proceed to FIG. 3B and/or FIG. 3C.

Block 312 illustrates accessing a second set of one or more predetermined rules that are required to be satisfied to temporarily unlock all services and/or functionalities previously unavailable to the device. In at least one example, the decision module 138 may access a rules database 144 and may access a second set of one or more predetermined rules that are mapped to, or otherwise associated with, a data entry corresponding to the device 102 (or a cohort of devices to which the device 102 belongs). The satisfaction of the second set of one or more predetermined rules may be conditional to temporarily unlocking all services and/or functionalities previously unavailable to the device 102. For the purpose of this discussion, a device 102 may be temporarily unlocked such that upon an occurrence of an event (e.g., a lapse of a predetermined period of time, a determination that a device is outside of a geographic region, determination that an account associated with the device is not current, etc.) can cause the device 102 to be re-locked. In at least one example, the second set of one or more predetermined rules may have at least one predetermined rule that is also in the first set of one or more predetermined rules.

Block 314 illustrates comparing the data and the second set of one or more predetermined rules. As described above, the decision module 138 may compare the data associated with the device 102 and/or the account associated with the device 102 with the second set of one or more predetermined rules and may determine whether the data associated with the device 102 and/or the account associated with the device satisfies the second set of one or more predetermined rules, as illustrated in block 316.

Responsive to determining that the data satisfies the second set of one or more predetermined rules, the decision module 138 may send an instruction to enable the device to temporarily unlock all services and/or functionalities previously unavailable to the device 102, as illustrated in block 318. Based at least in part on determining that the data associated with the device 102 and/or the account associated with the device 102 satisfies the second set of one or more predetermined rules, the decision module 138 may send an instruction to the device 102 to unlock all services and/or functionalities previously unavailable to the device 102. The instruction may direct the device 102 to modify a relationship between the SIM card 116 and the device 102. In at least one example, the instruction may cause a modification to the relationship between the SIM card 116 and the device 102 so that the device 102 does not look to the SIM card 116 for performing certain functionalities. Additionally and/or alternatively, the instruction may direct the device 102 to modify the profile 118 associated with the SIM card 116. In at least one example, the instruction may cause a modification to the profile 118 associated with the SIM card 116 so that the device 102 may access additional and/or alternative services from additional and/or alternative service providers.

In at least one example, the instruction may be associated with a constraint. That is, the instruction may be associated with an additional instruction to re-lock the device 102 upon the occurrence of an event. Non-limiting examples of an event include a lapse of a predetermined period of time, a determination that the device 102 is outside of a geographic region, determination that an account associated with the device 102 is not current, etc. That is, the enforcement module 126 may determine an occurrence of an event and may re-lock the device 102. In an alternative example, the decision module 138 may determine an occurrence of an event and may send an instruction to the device 102 to re-lock the device 102. The enforcement module 126 may receive the instruction and may re-lock the device 102.

Responsive to determining that the data does not satisfy the second set of one or more predetermined rules, the process may proceed to FIG. 3C.

Block 320 illustrates accessing a third set of one or more predetermined rules that are required to be satisfied to partially unlock the device. In at least one example, the decision module 138 may access a rules database 144 and may access a third set of one or more predetermined rules that are mapped to, or otherwise associated with, a data entry corresponding to the device 102 (or a cohort of devices to which the device 102 belongs). The satisfaction of the third set of one or more predetermined rules may be conditional to partially unlocking the device 102. For the purpose of this discussion, a device 102 may be partially unlocked by unlocking one or more services and/or one or more functionalities independently (i.e., as opposed to all together). In at least one example, the third set of one or more predetermined rules may have at least one predetermined rule that is also in the first set of one or more predetermined rules and/or the second set of one or more predetermined rules.

Block 322 illustrates comparing the data and the third set of one or more predetermined rules. As described above, the decision module 138 may compare the data associated with the device 102 and/or the account associated with the device 102 with the third set of one or more predetermined rules and may determine whether the data associated with the device 102 and/or the account associated with the device satisfies the third set of one or more predetermined rules, as illustrated in block 324.

Responsive to determining that the data does not satisfy the third set of one or more predetermined rules, the decision module 138 may send an indication that the request is denied as illustrated in block 326. As described above, in some examples, the indication may include data identifying reasons that the request is denied.

Responsive to determining that the data satisfies the third set of one or more predetermined rules, the decision module 138 may determine whether to partially unlock the device temporarily or permanently. In at least one examples, different services and/or functionalities may be associated with different constraints. That is, in some examples, the third set of one or more predetermined rules may be associated with a function or a service that may be unlocked permanently or the third set of one or more predetermined rules may be associated with a function or a service that may be unlocked temporarily. In at least one example, an additional set of one or more predetermined rules may be utilized to determine whether to permanently or temporarily partially unlock the device 102.

Based at least in part on determining to partially unlock the device temporarily, the decision module 138 may send an instruction to enable the device to partially unlock the device 102 temporarily, as illustrated in block 330. The instruction may direct the device 102 to modify a relationship between the SIM card 116 and the device 102. In at least one example, the instruction may cause a modification to the relationship between the SIM card 116 and the device 102 so that the device 102 does not look to the SIM card 116 for performing certain functionalities. Additionally and/or alternatively, the instruction may direct the device 102 to modify the profile 118 associated with the SIM card 116. In at least one example, the instruction may cause a modification to the profile 118 associated with the SIM card 116 so that the device 102 may access additional and/or alternative services from additional and/or alternative service providers.

In at least one example, the instruction may be associated with a constraint. That is, the instruction may be associated with an additional instruction to re-lock the device 102 upon the occurrence of an event. Non-limiting examples of an event include a lapse of a predetermined period of time, a determination that the device 102 is outside of a geographic region, determination that an account associated with the device 102 is not current, etc., as described above. That is, the enforcement module 126 may determine an occurrence of an event and may re-lock the device. In an alternative example, the decision module 138 may determine an occurrence of an event and may send an instruction to the device 102 to re-lock the device 102. The enforcement module 126 may receive the instruction and may re-lock the device 102.

Based at least in part on determining to partially unlock the device permanently, the decision module 138 may send an instruction to enable the device to partially unlock the device 102 permanently, as illustrated in block 332. The instruction may direct the device 102 to modify a relationship between the SIM card 116 and the device 102. In at least one example, the instruction may cause a modification to the relationship between the SIM card 116 and the device 102 so that the device 102 does not look to the SIM card 116 for performing certain functionalities. Additionally and/or alternatively, the instruction may direct the device 102 to modify the profile 118 associated with the SIM card 116. In at least one example, the instruction may cause a modification to the profile 118 associated with the SIM card 116 so that the device 102 may access additional and/or alternative services from additional and/or alternative service providers.

FIG. 4 illustrates an example process 400 for unlocking a device.

Block 402 illustrates receiving, from a server, an instruction to unlock a device. The enforcement module 126 may receive instruction(s) from the server(s) 104 and may execute the instruction(s). In some examples, the enforcement module 126 may receive instruction(s) in response to sending a request to unlock the device 102. In other examples, the enforcement module 126 may receive the instruction(s) without having first sent a request.

Block 404 illustrates determining whether to modify a relationship between a SIM card and the device and/or a profile of the SIM card. In at least one example, the instruction(s) may direct the device 102 to modify a relationship between the SIM card 116 and the device 102 and/or modify the profile 118 associated with the SIM card 116. The enforcement module 126 may determine whether to modify a relationship between the SIM card 116 and the device 102 and/or to modify the profile 118 associated with the SIM card 116.

Block 406 illustrates modifying the relationship between the SIM card and the device. Based at least in part on determining that the instruction(s) direct the device 102 to modify the relationship between the SIM card 116 and the device 102, the enforcement module 126 may modify the relationship between the device 102 and the SIM card 116 by modifying when the device 102 is to look for the SIM card 116. As a result, the device 102 may be able to access one or more services and/or one or more functionalities that the device 102 was not previously able to access.

Block 408 illustrates modifying the profile of the device. Based at least in part on determining that the instruction(s) direct the device 102 to modify the profile 118 associated with the SIM card 116 and the device 102, the enforcement module 126 may add, remove, or modify a group identifier associated with the profile 118. As a result, the device 102 may be able to access services from additional and/or alternative brands, channels, etc. associated with one or more telecommunication service providers.

Figure 5:
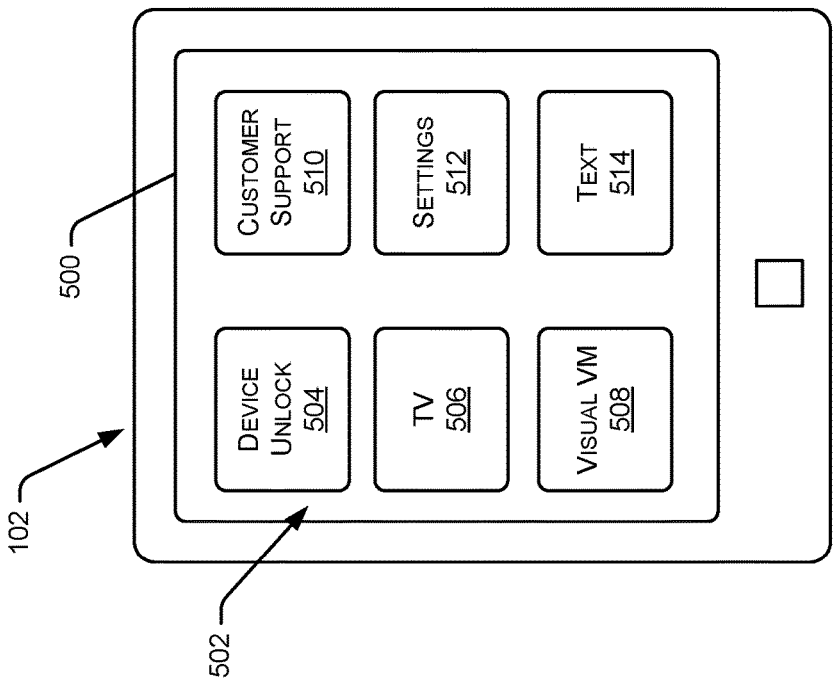
FIG. 5 illustrates an example of a graphical user interface configured to enable generating a request to unlock a device.

FIG. 5 illustrates an example of a graphical user interface configured to enable generating a request to unlock a device. In at least one example, the UI module 128 may be configured to present user interface(s) via a display 500 of a device 102. In at least one example, the UI module 128 may generate a graphical user interface 502 and may present the graphical user interface 502 via the display 500 of the device 102. In at least one example, the graphical user interface 502 may be associated with one or more graphical representations (e.g., 504-514). Each of the graphical representations may be associated with different resources (e.g., features and/or functionalities). In at least one example, a graphical representation may be associated with a control, the actuation of which activates a corresponding resource. For instance, graphical representation 504 may be associated with an unlocking resource. As described above, an account holder may interact with the user interface 502 to actuate the control corresponding to the unlocking resource and based at least in part on determining actuation of the control, the device 102 may send a request to the server(s) 104 to unlock the device 102.

Figure 6:
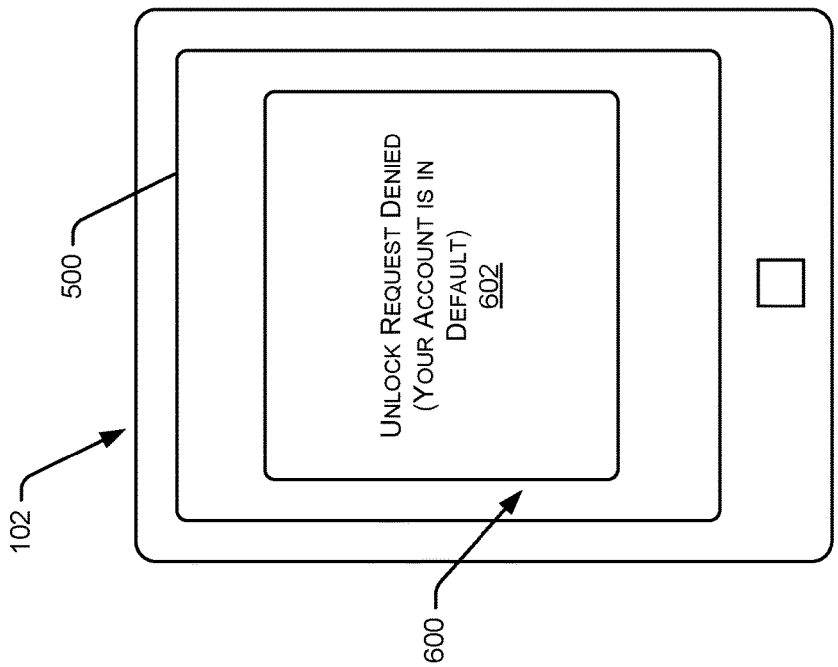
FIG. 6 illustrates an example of a graphical user interface configured to indicate that a request to unlock a device was denied, and in some examples, present an explanation as to why the request was denied.

FIG. 6 illustrates an example of a graphical user interface configured to indicate that a request to unlock a device was denied, and in some examples, present an explanation as to why the request was denied. As described above, in at least one example, the UI module 128 may be configured to present user interface(s) via a display 500 of a device 102. In at least one example, the UI module 128 may generate a graphical user interface 600 and may present the graphical user interface 600 via the display 500 of the device 102.

As described above, based at least in part on determining that the data associated with the device 102 and/or the account associated with the device 102 does not satisfy the one or more predetermined rules, the decision module 138 may determine that the device 102 is not permitted to be unlocked. In such an example, the decision module 138 may send an indication to the device 102 indicating that the request to unlock the device 102 is denied. In some examples, the indication may include data identifying reasons that the request is denied. Based at least in part on receiving the indication that the request is denied, the presentation module 128 may generate and present a representation of the indication via the display. Graphical element 602 is a non-limiting example of a representation of the indication. As shown, the graphical element 602 may indicate that the unlock request was denied. In at least one example, the graphical element 602 may include information as to why the request was denied (e.g., "your account is in default.").

FIGS. 5 and 6 illustrate non-limiting examples of user interfaces that may be presented via a display of a device. Additional and/or alternative configurations and/or presentations may be imagined.

Although the subject matter has been described in language specific to structural data items and/or methodological acts, it is to be understood that the subject matter defined in the appended claims is not necessarily limited to the specific data items or acts described. Rather, the specific data items and acts are disclosed as exemplary forms of implementing the claims.

What is claimed is:

1. A system comprising:
   a serving device, the serving device comprising:
   a database, the database including a data entry corresponding to an account holder associated with a telecommunications service, the data entry being associated with additional data identifying one or more attributes relating to at least one of a mobile device operated by the account holder or an account of the account holder;
   one or more processors;
   one or more instructions executable by the one or more processors to perform operations comprising:
   accessing one or more predetermined rules in a set of predetermined rules, individual ones of the predetermined rules being mapped to the mobile device and indicating when the mobile device may be unlocked;
   accessing, via the database, the additional data identifying the one or more attributes;

comparing the additional data identifying the one or more attributes to the set of predetermined rules;
determining that the additional data identifying the one or more attributes satisfies at least one of the one or more predetermined rules in the set of predetermined rules; and
sending an instruction to the mobile device; and
an application executable by the mobile device, the application including one or more instructions to perform operations comprising:
receiving the instruction from the serving device;
executing the instruction to modify at least one of:
a relationship between the mobile device and a subscriber identity module (SIM) card associated with the mobile device; or
a profile of the SIM card; and
effectuating a change from a locked state to an unlocked state.

2. The system as claim 1 recites, wherein the one or more instructions are further executable by the one or more processors to perform operations comprising receiving, from the mobile device, a request to unlock the mobile device.

3. The system as claim 2 recites, wherein the application further includes one or more instructions to present a graphical user interface via a display of the mobile device, the graphical user interface including a control, actuation of the control generating the request.

4. The system as claim 1 recites, wherein:
the instruction is associated with at least one time condition or geographical condition; and
the unlocked state comprises a temporary unlocked state such that upon occurrence of at least one of the time condition or the geographical condition, the application locks the mobile device.

5. The system as claim 1 recites, wherein executing the instruction to modify the relationship between the mobile device and the SIM card comprises modifying when the mobile device is to look for the SIM card.

6. The system as claim 1 recites, wherein executing the instruction to modify the profile of the SIM card comprises at least one of adding, removing, or modifying a group identifier associated with the profile.

7. The system as claim 1 recites, wherein the one or more attributes include at least one of:
a point of sale associated with the mobile device;
a duration of time associated with an activation of the account;
a rate plan associated with the account; or
a payment history associated with the account.

8. A computer-implemented method comprising:
receiving, from a device, a request to change from a first state to a second state, the first state corresponding to a locked state;
accessing data associated with at least one of the device or an account associated with the device;
comparing the data with one or more predetermined rules, individual ones of the predetermined rules being mapped to the device, satisfaction of at least one of the one or more predetermined rules being necessary to change from the first state to the second state;
determining that the data satisfies at least one of the one or more predetermined rules; and
sending, to the device, an instruction to enable the device to change from the first state to the second state, the instruction directing an application on the device to effectuate a change to a subscriber identity module (SIM) card associated with the device.

9. The computer-implemented method of claim 8, wherein the second state corresponds to a permanently unlocked state, the permanently unlocked state enabling the device to access all previously unavailable services and previously unavailable functionalities.

10. The computer-implemented method of claim 8, wherein the second state corresponds to a temporarily unlocked state, the temporarily unlocked state enabling the device to access all previously unavailable services and previously unavailable functionalities until an occurrence of an event.

11. The computer-implemented method of claim 10, wherein the event comprises at least one of:
a lapse of a predetermined period of time;
a determination that the device is outside of a predetermined geographic area; or
a determination that the account is in default.

12. The computer-implemented method of claim 8, wherein the instruction causes a change to a group identifier associated with the SIM card.

13. The computer-implemented method of claim 8, wherein the instruction relieves the device from accessing the SIM card.

14. The computer-implemented method of claim 8, wherein the data associated with at least one of the device or the account comprises at least one of:
an indication whether the device has been paid in full;
a rate plan associated with the account;
a duration of time that the account has been active; or
a payment history associated with the account.

15. One or more non-transitory computer-readable media storing instructions that, when executed by one or more processors, perform operations comprising:
receiving, from a device, a request to change from a first state to a second state;
accessing, via a database, data associated with an account associated with the device;
comparing the data with one or more predetermined rules, satisfaction of at least one of the one or more predetermined rules being necessary to change from the first state to the second state;
determining that the data satisfies at least one of the one or more predetermined rules; and
sending, to the device, an instruction to enable the device to change from the first state to the second state, the instruction directing an application on the device to effectuate a change to a subscriber identity module (SIM) card associated with the device; and
based at least in part on the device effectuating the change to the SIM card, granting an account associated with the device, access to at least one previously locked feature of a telecommunications service.

16. One or more non-transitory computer-readable media as claim 15 recites, wherein the previously locked feature comprises a particular rate plan.

17. One or more non-transitory computer-readable media as claim 15 recites, wherein the previously locked feature comprises a particular service provider.

18. One or more non-transitory computer-readable media as claim 15 recites, wherein granting the account associated with the device, access to the at least one previously locked feature of the telecommunications service comprises temporarily granting the account associated with the device, access to the at least one previously locked feature.

19. One or more non-transitory computer-readable media as claim 15 recites, wherein granting the account associated with the device, access to the at least one previously locked feature of the telecommunications service comprises permanently granting the account associated with the device, access to the at least one previously locked feature.

20. One or more non-transitory computer-readable media as claim 15 recites, wherein the change to the SIM card comprises a modification to at least one of a relationship between the device and the SIM card associated with the device or a profile of the SIM card.

* * * * *